United States Patent [19]
Long et al.

[11] 3,734,321
[45] May 22, 1973

[54] TRUCK LOAD BED BOAT LOADER AND CARRIER

[76] Inventors: Delmer B. Long, 3021 N.E. Johnson Street; Lewis E. Shelton, 3010 N.E. Johnson Street, both of Roseburg, Oreg. 97470

[22] Filed: Jan. 13, 1970

[21] Appl. No.: 2,583

[52] U.S. Cl.............214/450, 214/85.1, 224/42.1 H
[51] Int. Cl..............................................B60r 9/00
[58] Field of Search..........................214/450, 85.1; 224/42.1 H, 29 R

[56] References Cited
UNITED STATES PATENTS

| | | | |
|---|---|---|---|
| 3,411,644 | 11/1968 | Cook | 214/450 |
| 2,765,938 | 10/1956 | DiAddezio | 214/85.1 |

Primary Examiner—Robert G. Sheridan
Assistant Examiner—John Mannix
Attorney—Clarence A. O'Brien and Harvey B. Jacobson

[57] ABSTRACT

A ramp structure for support from the rear load carrying portion of a truck and including opposite side elongated and forwardly and upwardly inclined boat trailer wheel ramps and a center inclined guide rail along which a follower guidingly engaged therewith is movable. Removable inclined rearward wheel ramp extensions are provided for the rear ends of the wheel ramps and include rear end portions for support from the ground while the follower includes structure for removably coupling the front end of a boat trailer tongue thereto. Further, the ramp structure includes a forward elevated portion thereof from which a winch assembly is supported and the winch assembly includes a winch line for attachment to a rear portion, such as the axle assembly of a boat trailer.

16 Claims, 9 Drawing Figures

Patented May 22, 1973
3,734,321
3 Sheets-Sheet 1
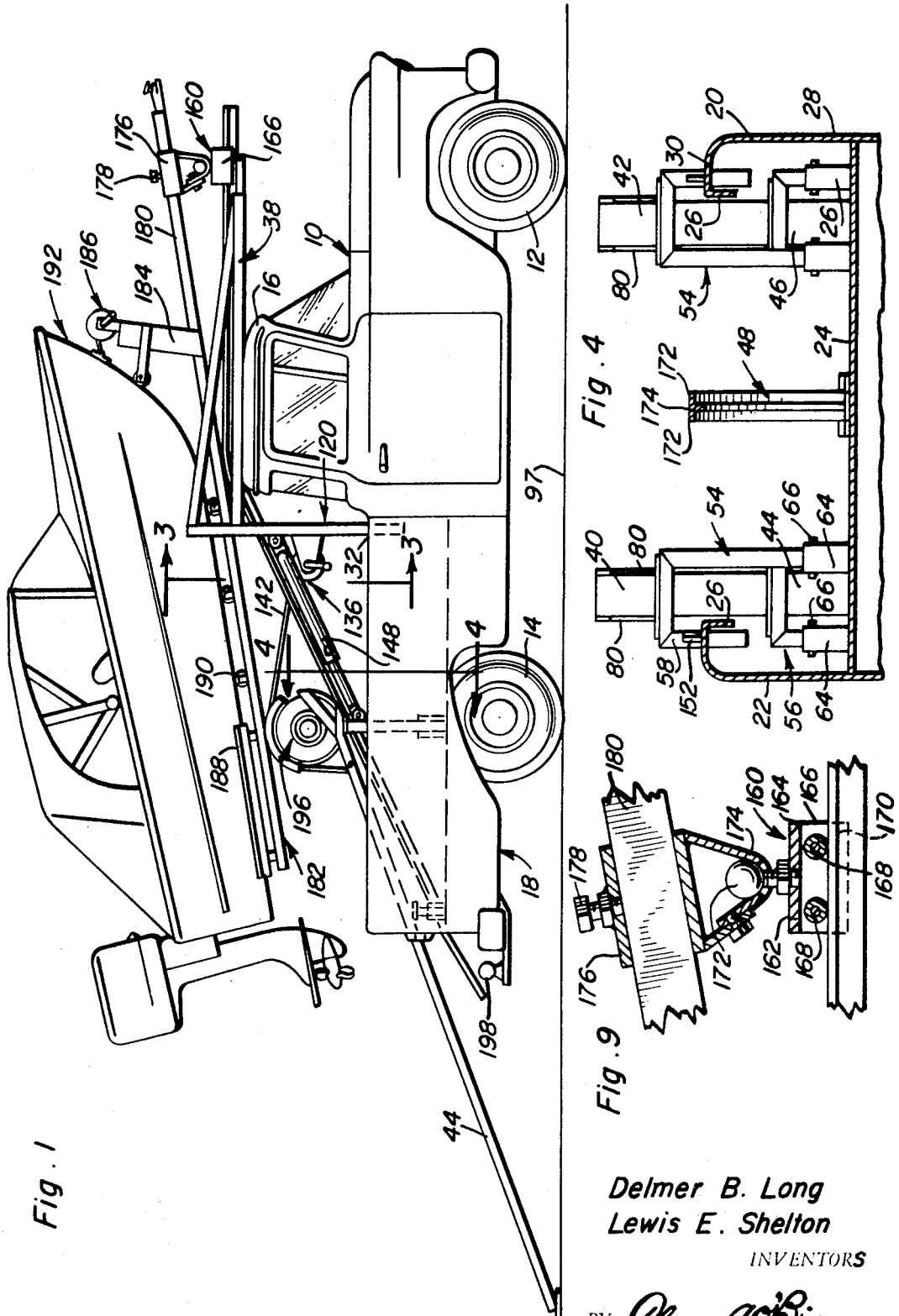
Delmer B. Long
Lewis E. Shelton
INVENTORS

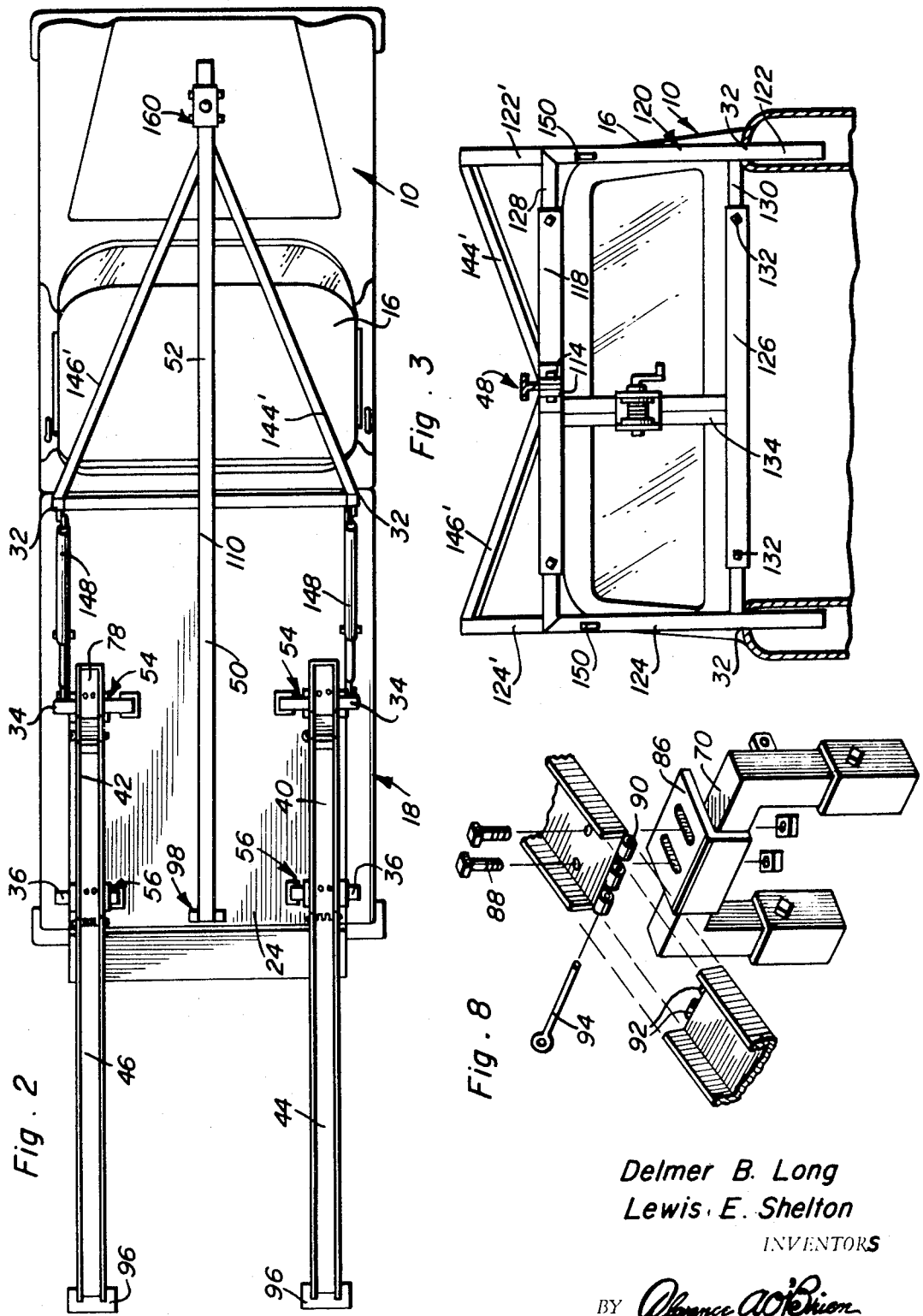

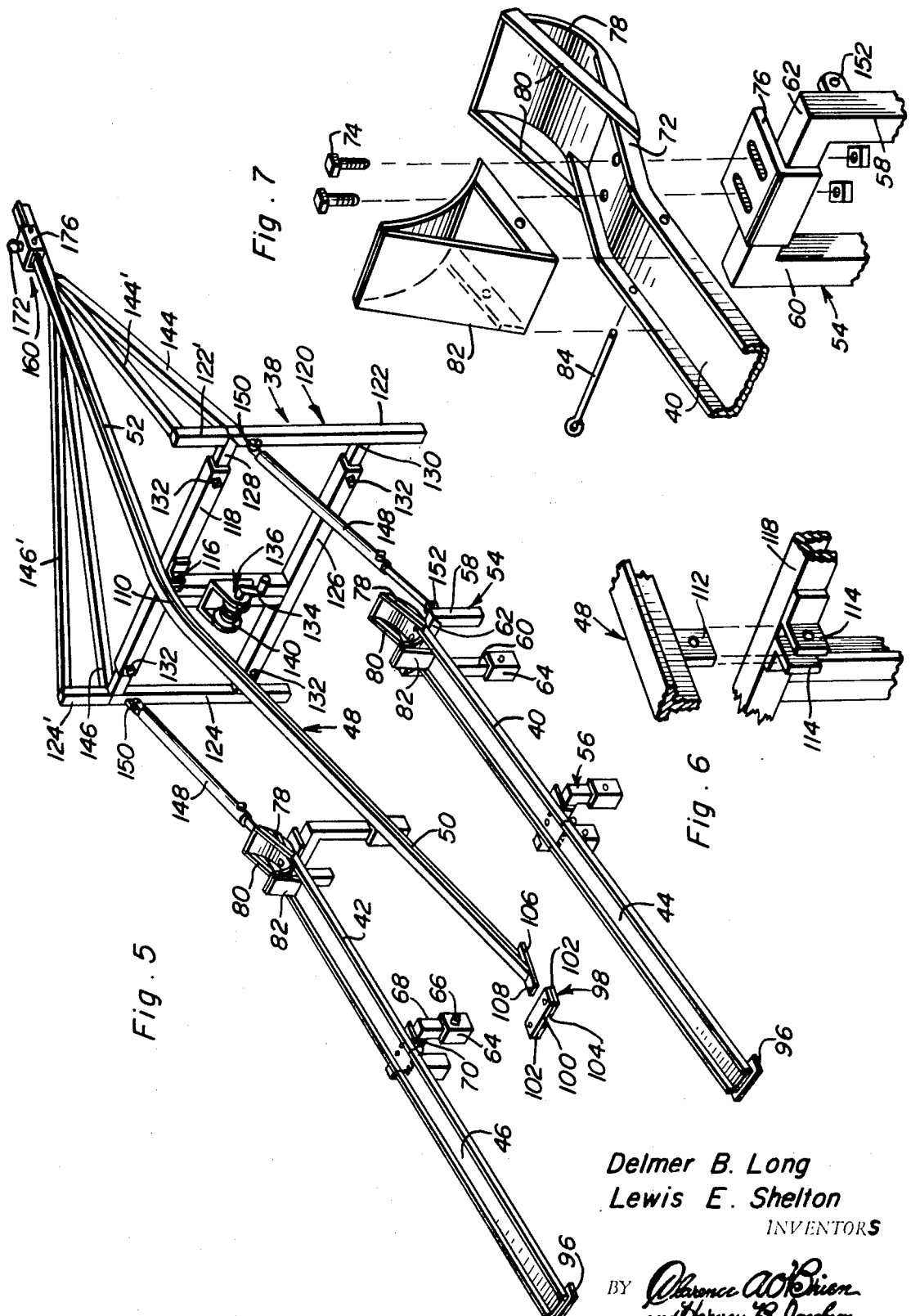

TRUCK LOAD BED BOAT LOADER AND CARRIER

The truck load bed boat loader and carrier of the instant invention has been designed to provide a means whereby a conventional boat trailer as well as the boat supported therefrom may be loaded onto the load bed of a pickup truck in an efficient manner.

Pickup trucks are often used by campers and other sportsmen for travel into and out of remote camping or sporting regions and while some sportsmen utilize relatively expensive camper bodies mounted on their pickup trucks while camping, other sportsmen utilize camping or house trailers which are towed behind the pickup trucks to and from the camping or sporting areas.

When a camper body is utilized on a pickup truck, a boat trailer may be readily towed behind the pickup truck. However, when a camping trailer or house trailer is towed behind the pickup truck, a boat trailer may not be towed behind the camping or house trailer. In addition, when a camper body is utilized by sportsmen, the picku truck may not be readily moved over rough terrain to a hunting or fishing site and accordingly sports men often find it necessary to demount a camper body and set up camp before the desired remote sporting area is reached so that they may thereafter proceed to the sporting area in the pcikup truck without the camper body mounted thereon.

Of course, camping and boat trailers may be towed over reasonably rough ground and accordingly, it is the main object of this invention to provide a means whereby the owner of a pickup truck may transport not only a camping trailer but also a loaded boat trailer to a remote camping area by utilizing a pickup truck or the like.

Another object of this invention, in accordance with the immediately preceding object, is to provide a readily demountable structure on a pickup truck load bed operable to pull a loaded boat trailer up onto the pickup truck load bed for support therefrom during transit and in a manner such that the positioning of the boat trailer and boat on the pickup truck load bed will not interfere with the towing of a house or a camp trailer behind the pickup truck.

A still further object of this invention is to provide a device in accordance with the preceding objections specifically designed to handle, load and carry a conventional boat trailer having a boat disposed thereon.

Another object of this invention is to provide a device in accordance with the preceding objects constructed in a manner whereby it may be readily adjusted for support from different pickup truck load beds.

A further important object of this invention is to provide a pickup truck load bed boat loader and carrier constructed in a manner whereby the over-all height of the pickup truck and carrier will be maintained at a minimum when a boat and boat trailer are not supported from the carrier so as to thereby free the unladen pickup truck for ease in travel over rough terrain.

A final object of this invention to be specifically enumerated herein is to provide a pickup truck load bed boat loader and carrier in accordance with the preceding objects which will conform to conventional forms of manufacture, be of simple construction and easy to mount and dismount so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a conventional form of pickup truck with the boat loader and carrier of the instant invention supported therefrom and a boat trailer having a boat disposed thereon mounted upon the carrier;

FIG. 2 is a top plan view of the assemblage illustrated in FIG. 1 with the boat trailer and boat removed;

FIG. 3 is a fragmentary enlarged transverse vertical sectional view taken substantially upon the plane indicated by section line 3—3 of FIG. 1;

FIG. 4 is an enlarged fragmentary transverse vertical sectional view taken substantially upon the plane indicated by section line 4—4 of FIG. 1;

FIG. 5 is an exploded perspective view of the boat loader and carrier;

FIG. 6 is a fragmentary exploded perspective view illustrating the manner in which the upper end portion of the guide rail structure of the boat loader and carrier is removably supported from the front support frame of the boat loader and carrier;

FIG. 7 is a fragmentary exploded perspective view illustrating the manner in which the upper end of one of the wheel ramps of the carrier is mounted and also the manner in which a wheel chock is removably supported from the upper end of the trailer wheel ramp;

FIG. 8 is an exploded perspective view illustrating the manner in which the rear end of one of the wheel ramps is supported from the load bed of the pickup truck and the upper forward end of a ramp extension is removably supported from the rear end of the wheel ramp; and FIG. 9 is a fragmentary vertical sectional view taken substantially upon a plane passing through the center of the guide track mounted carrier to which the forward end of the boat trailer tongue is removably secured and on somewhat of an enlarged scale.

Referring now more specifically to the drawings, the numeral 10 generally designates a conventional form of pickup truck including front wheels 12 and rear wheels 14. The truck 10 also includes a forward cab 16 and a rear load bed assembly referred to in general by the reference numeral 18. The load bed assembly 18 includes opposite side wall structures 20 and 22 which are interconnected by means of a flooring 24 and it may be seen that each of the side wall structures 20 and 22 includes inner and outer wall panels 26 and 28 interconnected along their upper marginal edge portions by means of a top wall panel 30.

The top wall panels 30 include longitudinally spaced openings 32, 34 and 36 defining upwardly opening sockets in which depending anchor portions of side extensions (not shown) may be engaged.

The foregoing may be considered as a description of a conventional form of pickup truck.

The boat loader and carrier of the instant invention is referred to in general by the reference numeral 38 and includes a pair of elongated channel-shaped ramps 40 and 42, a pair of rearward ramp extensions 44 and 46 and an elongated guide rail structure referred to in general by the reference numeral 48 including a downwardly and rearwardly inclined lower end portion 50 and a forwardly projecting generally horizontal forward end portion 52.

Each of the ramps 40 and 42 includes front and rear depending supports 54 and 56. The front supports 54 include generally parallel upstanding short and long legs 58 and 60 interconnected at their upper ends by means of a horizontal bight portion 62 and each of the short legs 58 is receivable downwardly in the corresponding opening 34 with the associated bight portion 62 resting upon the top wall panel 30. Each of the long legs 60 includes an adjustable downwardly extendible tubular foot portion 64 which may be retained in adjusted position by means of any suitable fastener 66 for full seated engagement of the foot portion 64 with the floor 24 of the load bed assembly 18.

Each of the supports 56 includes a pair of upstanding legs 68 interconnected by means of a bight portion 70 and the ends of each of the legs 68 includes a similar adjustable foot portion 64 which also may be retained in adjusted position by means of a fastener 66. The supports 56 are supported from opposite side portions of the rear end portion of the flooring 24 with their foot portions 64 adjusted as desired and the upper end of each ramp 40 includes a horizontal portion 72 which is secured by fasteners 74 to a slotted mounting plate 76 secured to the corresponding bight portion 62. The forward ends of the horizontal portions 72 curve upwardly as at 78 and are braced by means of diagonal braces. In addition, the upper end of each ramp 40 includes a removable chock assembly 82 anchored just rearward of the corresponding horizontal portion 52 by means of a removable pin 84 secured through the chock assembly 82 and the side flanges of the ramp 40.

Each of the bight portions 70 also has a slotted mounting plate 86 secured thereto in any convenient manner similar to the mounting plate 76 and a pair of removable fasteners 88 are utilized to secure the rear end of each ramp 40 to the corresponding mounting plate 86. The rear ends of the ramps 44 include transversely spaced axially aligned hinge barrels 90 between which similar hinge barrels 92 carried by the upper ends of the ramp extension 44 are receivable and removable hinge pins 94 are secured through the hinge barrels 90 and 92 so as to secure the upper ends of the ramp extensions 44 and 46 to the lower ends of the ramps 40 and 42. Further, the lower ends of the ramp extensions 44 include horizontal load pads 96 for engagement with the ground 97 upon which the pickup truck 10 rests.

A mounting block referred to in general by the reference numeral 98 is provided and includes an upper elongated plate 100 which extends transversely of the central portion of the rear marginal edge of the flooring 24. The plate 100 has its opposite ends supported by means of spacer blocks 102 secured to the floor 24 and to which the opposite ends of the plate 100 are secured. Accordingly, a longitudinal passage 104 is defined beneath the plate 100 between the blocks 102.

The rear lower end of the guide rail structure 48 includes a horizontal load pad or foot 106 including a rearward extension 108 which is receivable in the passage 104 for securing the rear end of the guide rail structure 48 to the floor 24.

The rear end portion 50 of the guide rail structure 48 terminates upwardly in a forwardly curving portion 110 whose forward end merges smoothly with the forward end portion 52 of the guide rail structure 48. The forwardly curving portion 110 includes a depending apertured mounting lug 112 which is secured between a pair of apertured mounting lugs 114 by means of a fastener 116. The mounting lugs 114 are carried by and project rearwardly from the central portion of an upper horizontal member 118 of a support frame referred to in general by the reference numeral 120. The support frame 120 includes upstanding opposite side members 122 and 124 and the upper horizontal member 118 as well as a lower horizontal member 126. The horizontal members 118 and 126 are tubular and the members 122 and 124 include upper and lower laterally inwardly projecting arms 128 and 130 which are secured in adjustably telescoped positions within the members 118 and 126 by means of fasteners 132. The upper and lower member 118 and 126 are interconnected by means of vertical members 134 from which a winch assembly referred to in general by the reference numeral 136 is supported and it may be seen that the winch assembly 136 includes a winding member 140 upon which one end portion of an elongated flexible tension member 142 is wound.

The opposite side members 122 and 124 include upper and forwardly convergent braces 144 and 146 whose rear ends are secured to the members 122 and 124 and whose forward ends are secured to lower opposite side portions of the forward end portion 52 of the guide rail structure 48. In addition, each of the members 122 and 124 includes upward extensions 122' and 124' and a pair of forwardly convergent braces 144' and 146' have their rear ends secured to the upper ends of the extensions 122' and 124' and their forward ends secured to forward lower opposite side portions of the guide rail structure 48 and the forward ends of the braces 144 and 146. Thus, the forward end portion 52 of the guide rail structure 48 is rigidly braced from the support frame 120 and it may be seen in FIG. 5 of the drawings that adjustable length inclined brace members 148 have their upper ends pivotally secured to mounting ears 150 carried by the upper ends of the members 122 and 124 and their rear ends pivotally secured to apertured mounting ears 152 carried by the upper ends of the short legs 58 of the supports 54.

The lower ends of the members 122 and 124 are received downwardly in the openings 32 and the undersurface portions of the arms 130 abut the top wall portions 30 of the side wall structures 20 and 22. Thus, it may be seen that the boat loader and carrier 38 may be adjusted so as to compensate for pickup trucks having different spacing between the side wall structures thereof and different spacing between the upwardly opening sockets defined by the openings 32 and 34.

With attention now invited more specifically to FIG. 9 of the drawings there may be seen a follower assembly referred to in general by the reference numeral 160 and which includes an inverted channel member 162 including an upper bight portion 164 and depending opposite sides 166 between which a pair of rollers 168 are journalled. The lower marginal edge portions of the sides 166 include inturned flange portions 170 and the inner marginal edge portions of the flanges 70 underlie the opposite side marginal edges portions 172 of the horizontal flange portion 174 of the T-shaped guide rail structure 48 whereby the follower 160 is rollingly and guidingly supported from the guide rail structure 48.

The channel member 62 includes an upwardly projecting ball member 172 captively and universally received within the slotted lower depending portion 174 of a mounting sleeve portion 176 of the follower 160. The mounting sleeve portion 176 includes a setscrew 178 and is adapted to receive the front end portion of the tongue 180 of a conventional boat trailer referred to in generaly by the reference numeral 182 therethrough. The boat trailer 182 includes the usual bow stop 184 having a winch assembly 186 mounted on its upper end and the boat trailer 182 further includes boat hull cradling structure 188 and 190 from which the undersurface portions of a boat referred to in general by the reference numeral 192 are supported.

In operation, the boat loader and carrier may be mounted upon the pickup truck 10 in a manner which is believed apparent from the foregoing description after any necessary adjustments have been made to adapt the boat loader and carrier 38 to the particular pickup truck being utilized. After the boat loader and carrier has once been mounted on the pickup truck, and it is desired to load the boat trailer 182 and the boat 192 on the pickup truck, the ramp extensions 44 are removed from within the load bed assembly 18 of the truck 10 and attached to the rear ends of the ramps 40 and 42. Thereafter, the follower 160 is moved rearwardly along the guide rail structure 48 to the lower end of the latter and the tongue 180 of the boat trailer 182 is lifted off the ground 98 and forwardly telescoped into the mounting sleeve portion 176 and secured therein by means of the setscrew 178. Then, the winding member or reel 140 of the winch assembly 136 may be rotated to unwind the free end portion of the cable or tension member 142 from the winding member 140. Then, the free end portion of the cable 142 is attached to the frame of the trailer 182 above the rear axle assembly 196 thereof and the winch assembly 136 is actuated to draw the loaded boat trailer 182 upwardly along the ramp extensions 44 and 46 and the ramps 40 and 42 until the wheels of the trailer 182 are embraced by the upwardly curving portions 78 of the ramps 40. thereafter, with tension still applied to the cable 142, the chock assemblies 82 are secured in position on the upper ends of the ramp 40 and 42 by means of the pins 84. In this manner, the boat trailer 182 with the boat 192 thereon may be readily loaded onto the boat loader and carrier 138. Of course, before the truck 110 is placed in transit, the ramp extensions 44 and 46 are removed and placed within the load bed assembly 18.

It will be noted from FIG. 1 of the drawings that the ball hitch element 198 at the rear of the pickup truck 10 is fully exposed when the boat loader and carrier 38 as well as the boat trailer 182 and boat 192 are mounted on the pickup truck 10 and therefore that any type of trailer may be readily trailed behind the pickup truck 10. Further, with the boat trailer 182 and boat 192 removed, the over-all height of the pickup truck 10 is increased only slightly. Thus, the upper horizontal forward end portion 52 of the guide rail structure 48 serves to maintain the over-all height of the pickup truck 10 with the loader 38 attached at a minimum while still enabling the loader 38 to handle a long boat trailer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a truck including a rear load bed and a forward elevated cab portion, a boat loading and carrying apparatus comprising an elongated ramp structure removably supported from the rear load bed of said truck and including elongated opposite side forwardly and upwardly inclined boat trailer wheel ramps, the forward ends of which terminate below and to the rear of the roof of said cab portion and a central inclined guide rail, a follower guidingly engaged with the rail for movement therealong and including means for articulatively coupling the front end portion of a boat trailer thereto, said apparatus including a winch system for coupling to an associated boat trailer and pulling the trailer, and its load, upwardly along said ramps, the upper end of the rail including a downwardly deflected generally horizontal upper forward end portion closely overlying the forward cab portion of the truck.

2. The combination of claim 1 wherein the rear lower ends of said ramps are supported adjacent the rear end of the load bed, and a pair of elongated inclined rearward ramp extension having their upper ends removably supported in longitudinal registry with the rear ends of said ramps and their lower ends disposed for support from the ground upon which said truck is disposed.

3. The combination of claim 1 including a pair of wheel chock assemblies removably attachable to said ramps intermediate their upper and lower ends for disposition behind the wheels of a boat trailer disposed on said ramps.

4. The combination of claim 1 wherein said ramps include front and rear depending support portions removably supported from longitudinally spaced portions of said load bed, a forward upright horizontally elongated frame extending transversely of and supported from the front end portion of said load bed, means defining elongated bracing extending longitudinally of the opposite sides of said load bed and interconnected between said front support portions and the corresponding ends of said frame.

5. The combination of claim 4 wherein said elongated bracing includes means whereby its effective length may be adjusted.

6. The combination of claim 4 wherein said winch system includes a winding member journaled from an upper portion of said frame and an elongated flexible tension member having one end thereof wound on said winding member.

7. The combination of claim 4 wherein said guide rail includes a rear upwardly inclined portion whose lower rear end is supported from the rear portion of said load bed and whose upper end is supported from said support frame, said downwardly deflected generally horizontal upper forward end portion of said guide rail projecting forwardly past said support frame.

8. The combination of claim 7 wherein said frame includes opposite side forwardly projecting and convergent brace members whose forward ends are secured to opposite sides of the front end portion of said horizontal portion of said guide rail.

9. In combination with a truck including a rear load bed and a forward elevated cab portion, a boat loading and carrying apparatus comprising an elongated ramp structure removably supported from the rear load bed of said truck and including elongated opposite side forwardly and upwardly inclined boat trailer wheel ramps and a central inclined guide rail, a follower guidingly engaged with the rail for movement therealong and including means for articulatively coupling the front end portion of a boat trailer thereto, said apparatus including a winch system for coupling to an associated boat trailer and pulling the trailer, and its load, upwardly along said ramps, said ramps including front and rear depending support portions removably supported at their lower ends from longitudinally spaced portions of said load bed, said depending support portions including means for adjusting the effective length of each, a forward upright horizontally elongated frame extending transversely of and supported from the front end portion of said load bed, means defining elongated bracing extending longitudinally of the opposite sides of said load bed and interconnected between said front support portions and the corresponding ends of said frame.

10. The combination of claim 9 wherein said elongated bracing includes means whereby its effective length may be adjusted.

11. The combination of claim 1 wherein the forward upper ends of said ramps terminate in generally horizontal terminal ends which curve upwardly at their forward ends, and wheel chock members removably secured to the upper ends of said ramps immediately rearward of said horizontal terminal end, said chocks and said upwardly curving forward ends of said horizontal ramp terminal ends coacting to form deep boat trailer wheel receiving recesses.

12. In combination with a truck including a rear load bed and a forward elevated cab portion, a boat loading and carrying apparatus comprising an elongated ramp structure removably supported from the rear load bed of said truck and including elongated opposite side forwardly and upwardly inclined boat trailer wheel ramps and a central inclined guide rail, a follower guidingly engaged with the rail for movement therealong and including means for articulatively coupling the front end portion of a boat trailer thereto, said apparatus including a winch system for coupling to an associated boat trailer and pulling the trailer, and its load, upwardly along said ramps, the forward upper ends of said ramps terminating in generally horizontal terminal ends which curve upwardly at their forward ends, and wheel chock members removably secured to the upper ends of said ramps immediately rearward of said horizontal terminal end, said chocks and said upwardly curving forward ends of said horizontal ramp terminal ends coacting to form deep boat trailer wheel receiving recesses.

13. The combination of claim 12 wherein said ramps include front and rear depending support portions removably supported from longitudinally spaced portions of said load bed, said front depending support portions being disposed vertically beneath said horizontal ramp terminal ends.

14. The combination of claim 1 including a boat trailer of generally conventional design including a generally straight horizontally extending longitudinal frame provided with (1) a forwardly projecting tongue portion, (2) means for cradling a boat hull thereon, and (3) underslung wheeled running gear means spaced forward of the rear end of said frame and rearward of the longitudinal center of said frame, said pulling tongue including means for removable securement to said follower and said wheeled running gear being rollable upwardly along said ramps.

15. In combination with a truck including a rear load bed and a forward elevated cab portion, a boat loading and carrying apparatus comprising an elongated ramp structure removably supported from the rear load bed of said truck and including elongated opposite side forwardly and upwardly inclined boat trailer wheel ramps and a central inclined guide rail, a follower guidingly engaged with the rail for movement therealong and including means for articulatively coupling the front end portion of a boat trailer thereto, said apparatus including a winch system for coupling to an associated boat trailer and pulling the trailer, and its load, upwardly along said ramps, said ramps including front and rear depending support portions removably supported at their lower ends from longitudinally spaced portions of said load bed, said depending support portions including means for adjusting the effective length of each, said upper end of said rail including a downwardly deflected generally horizontal upper forward end portion closely overlying the forward cab portion of said truck.

16. The combination of claim 15 including a boat trailer of generally conventional design including a generally straight horizontally extending longitudinal frame provided with (1) a forwardly projecting tongue portion, (2) means for cradling a boat hull thereon, and (3) underslung wheeled running gear means spaced forward of the rear end of said frame and rearward of the longitudinal center of said frame, said pulling tongue including means for removable securement to said follower and said wheeled running gear being rollable upwardly along said ramps.

* * * * *